(12) United States Patent
Chamberlin et al.

(10) Patent No.: US 8,975,792 B2
(45) Date of Patent: Mar. 10, 2015

(54) ELECTRIC MACHINE MODULE COOLING SYSTEM AND METHOD

(75) Inventors: Bradley D. Chamberlin, Pendleton, IN (US); Arlen Phillip Suter, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 634 days.

(21) Appl. No.: 13/231,491

(22) Filed: Sep. 13, 2011

(65) Prior Publication Data
US 2013/0062974 A1    Mar. 14, 2013

(51) Int. Cl.
*H02K 9/00* (2006.01)
*H02K 5/20* (2006.01)

(52) U.S. Cl.
CPC ....................................... *H02K 5/20* (2013.01)
USPC ............................................... 310/59; 310/54

(58) Field of Classification Search
USPC .......................................... 310/52, 54, 57, 59
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,873,393 A * | 2/1959 | Baudry ........................... | 310/55 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,517,479 A * | 5/1985 | Aleem et al. .................... | 310/54 |
| 5,081,382 A | 1/1992 | Collings et al. | |
| 5,180,004 A | 1/1993 | Nguyen | |
| 5,207,121 A | 5/1993 | Blen | |
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, Received Jul. 31, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.

(Continued)

*Primary Examiner* — Dang Le
(74) *Attorney, Agent, or Firm* — Greenberg Traurig, LLP

(57) ABSTRACT

Embodiments of the invention provide an electric machine module. The module can include a housing, which can define a machine cavity. In some embodiments, a coolant jacket can be at least partially positioned within the housing. In some embodiments, a plurality of coolant apertures can be disposed through at least a portion of the housing to fluidly connect the coolant jacket and the machine cavity. The coolant apertures can include a first group configured and arranged to direct a first volume from the coolant jacket. The coolant apertures can include a second group configured and arranged to direct a second volume from the coolant jacket. In some embodiments, the first volume can be greater than the second volume.

7 Claims, 11 Drawing Sheets

(56) References Cited

U.S. PATENT DOCUMENTS

| | | | |
|---|---|---|---|
| 6,011,332 A | 1/2000 | Umeda et al. |
| 6,069,424 A | 5/2000 | Colello et al. |
| 6,075,304 A | 6/2000 | Nakatuska |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakuraki |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,714,468 B2 | 5/2010 | Hashiba et al. |
| 7,939,975 B2 | 5/2011 | Saga et al. |
| 8,067,865 B2 | 11/2011 | Savant |
| 8,068,327 B2 | 11/2011 | Seifert et al. |
| 2002/0074889 A1 | 6/2002 | Kikuchi et al. |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 | 5/2009 | Yim |
| 2009/0174278 A1 | 7/2009 | Sheaffer et al. |
| 2009/0206687 A1 | 8/2009 | Woody et al. |
| 2009/0267426 A1 | 10/2009 | Graner et al. |
| 2010/0026111 A1 | 2/2010 | Monzel |
| 2010/0045125 A1* | 2/2010 | Takenaka et al. ............... 310/54 |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2005-253263 A | 9/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| JP | 2010-246268 A | 10/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report completed Apr. 9, 2012.
International Search Report completed Apr. 20, 2012.
International Search Report completed Mar. 8, 2012.
International Search Report completed Apr. 24, 2012.
KIPO Search Report and Written Opinion dated Feb. 28, 2013 for corresponding application No. PCT/US2012/054846.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

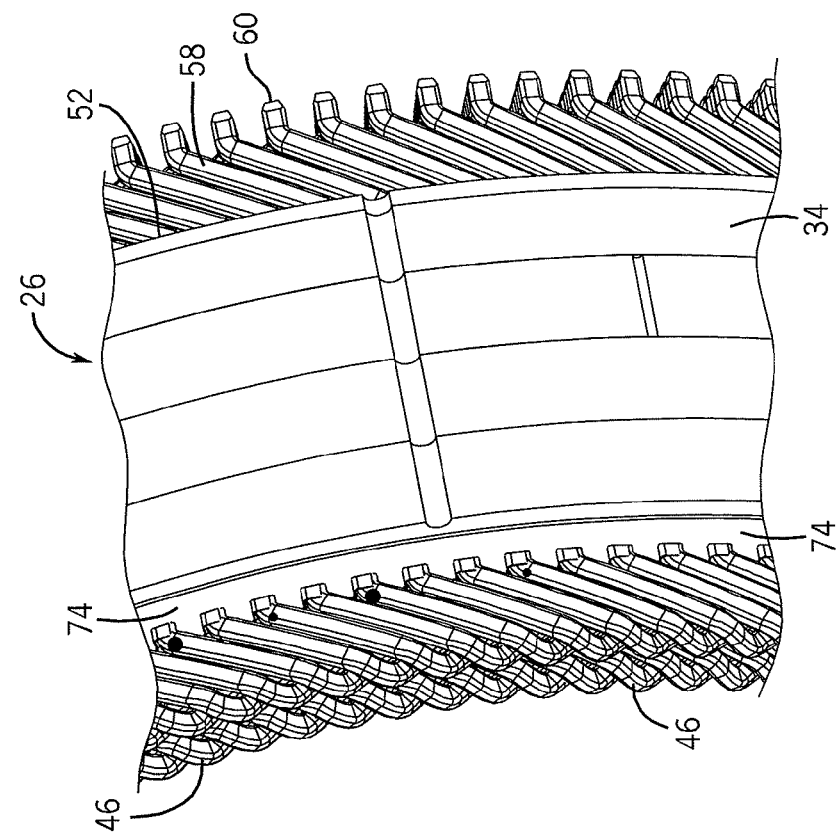
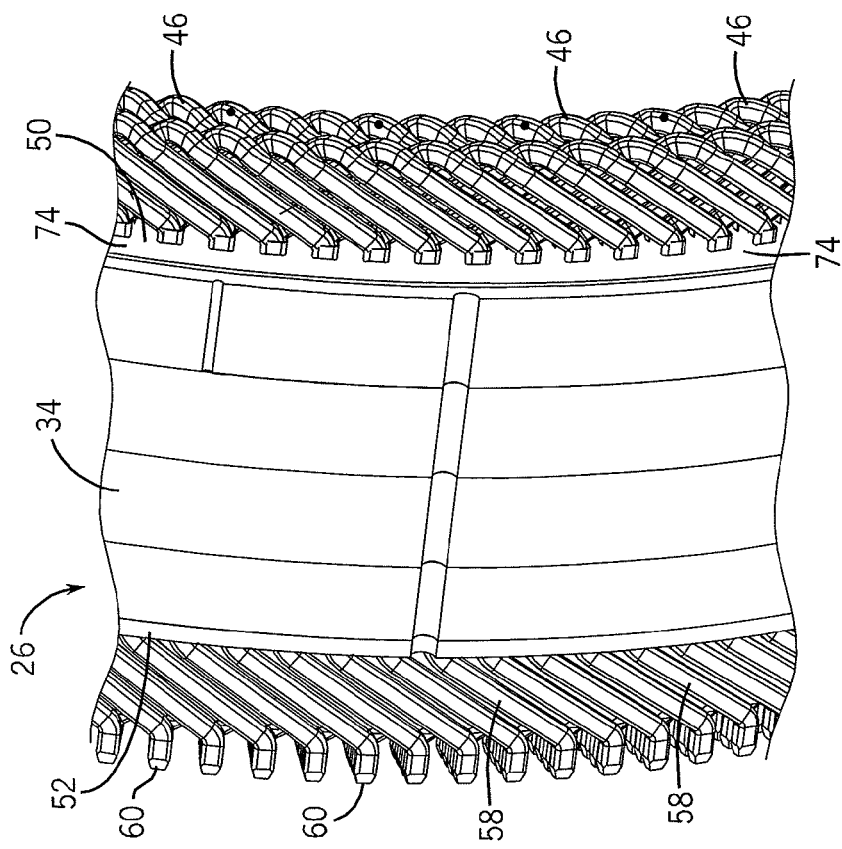

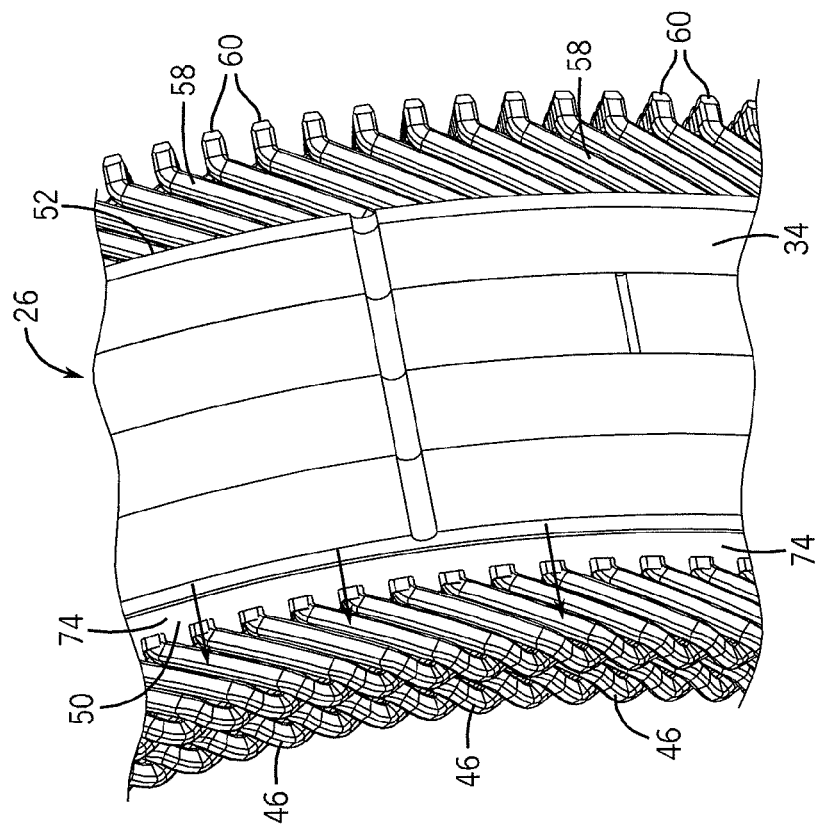
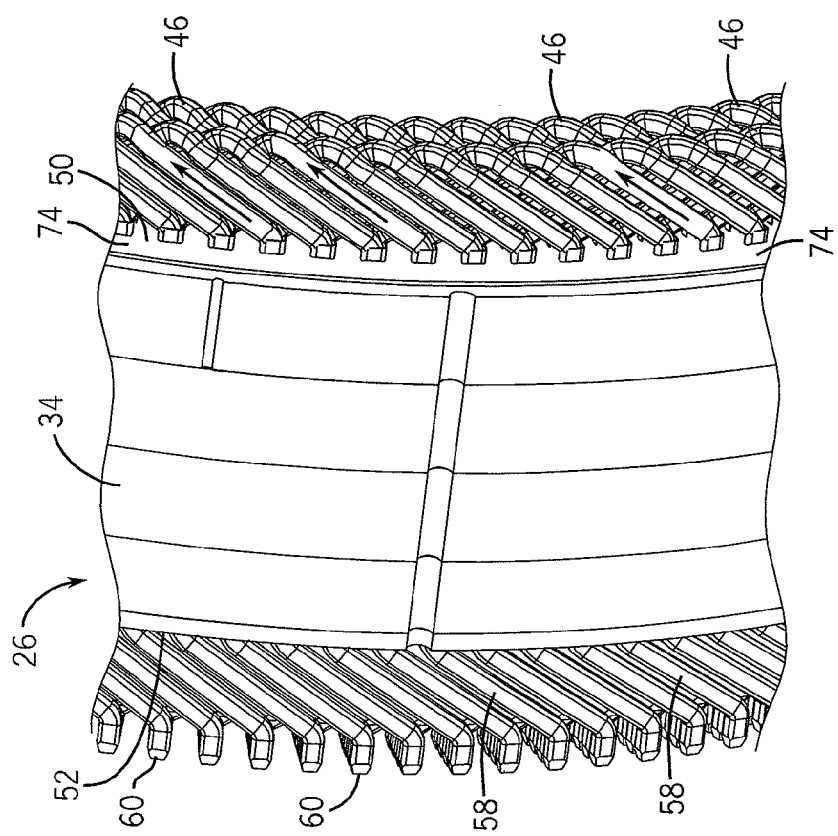

ELECTRIC MACHINE MODULE COOLING SYSTEM AND METHOD

BACKGROUND

Electric machines, often contained within a machine cavity of a housing, generally include a stator assembly and a rotor assembly. For some electric machines, the stator assembly can be secured to the housing using different coupling techniques to generally secure the electric machine within the housing. During operation of some electric machines, heat energy can by generated by both the stator assembly and the rotor assembly, as well as other components of the electric machine. For some electric machines, the increase in heat energy produced by some elements of the electric machine can lead to inefficient machine operations.

SUMMARY

Some embodiments of the invention provide an electric machine module. The module can include a housing, which can define a machine cavity. In some embodiments, a coolant jacket can be at least partially positioned within the housing. In some embodiments, a plurality of coolant apertures can be disposed through at least a portion of the housing to fluidly connect the coolant jacket and the machine cavity. In some embodiments, the coolant apertures can comprise a first group of coolant apertures and a second group of coolant apertures. In some embodiments, the first group of coolant apertures can be configured and arranged to direct a first volume of coolant from the coolant jacket. In some embodiments, the second group of coolant apertures can be configured and arranged to direct a second volume of coolant from the coolant jacket. In some embodiments, the first volume of coolant can be greater than the second volume of coolant.

Some embodiments of the invention provide an electric machine module. The module can include a housing, which can define a machine cavity. In some embodiments, a coolant jacket can be at least partially positioned within the housing. In some embodiments, a stator assembly can be positioned within the machine cavity and at least partially enclosed by the housing. In some embodiments, the stator assembly can comprise a stator core and stator end turns extending from the stator core. In some embodiments, a plurality of coolant apertures can be disposed through at least a portion of the housing to fluidly connect the coolant jacket and the machine cavity. In some embodiments, the coolant apertures can be disposed through the housing so that at least a portion of the apertures can be substantially adjacent to at least a portion of the stator end turns. In some embodiments, the coolant apertures can comprise a first group of coolant apertures and a second group of coolant apertures. In some embodiments, the first group of coolant apertures can be configured and arranged to direct a portion of a coolant to a first impingement location on at least a portion of the stator end turns. In some embodiments, the second group of coolant apertures can be configured and arranged to direct a portion of the coolant to a second impingement location on at least a portion of the stator end turns. In some embodiments, the first impingement location can be a greater axial distance from the stator core relative to the second impingement location.

DESCRIPTION OF THE DRAWINGS

FIGS. 8A and 8B are partial isometric views of a stator assembly and coolant distribution patterns according to one embodiment of the invention.

FIGS. 9A and 9B are partial isometric views of a stator assembly and coolant distribution patterns according to one embodiment of the invention.

DETAILED DESCRIPTION

Figure 1:
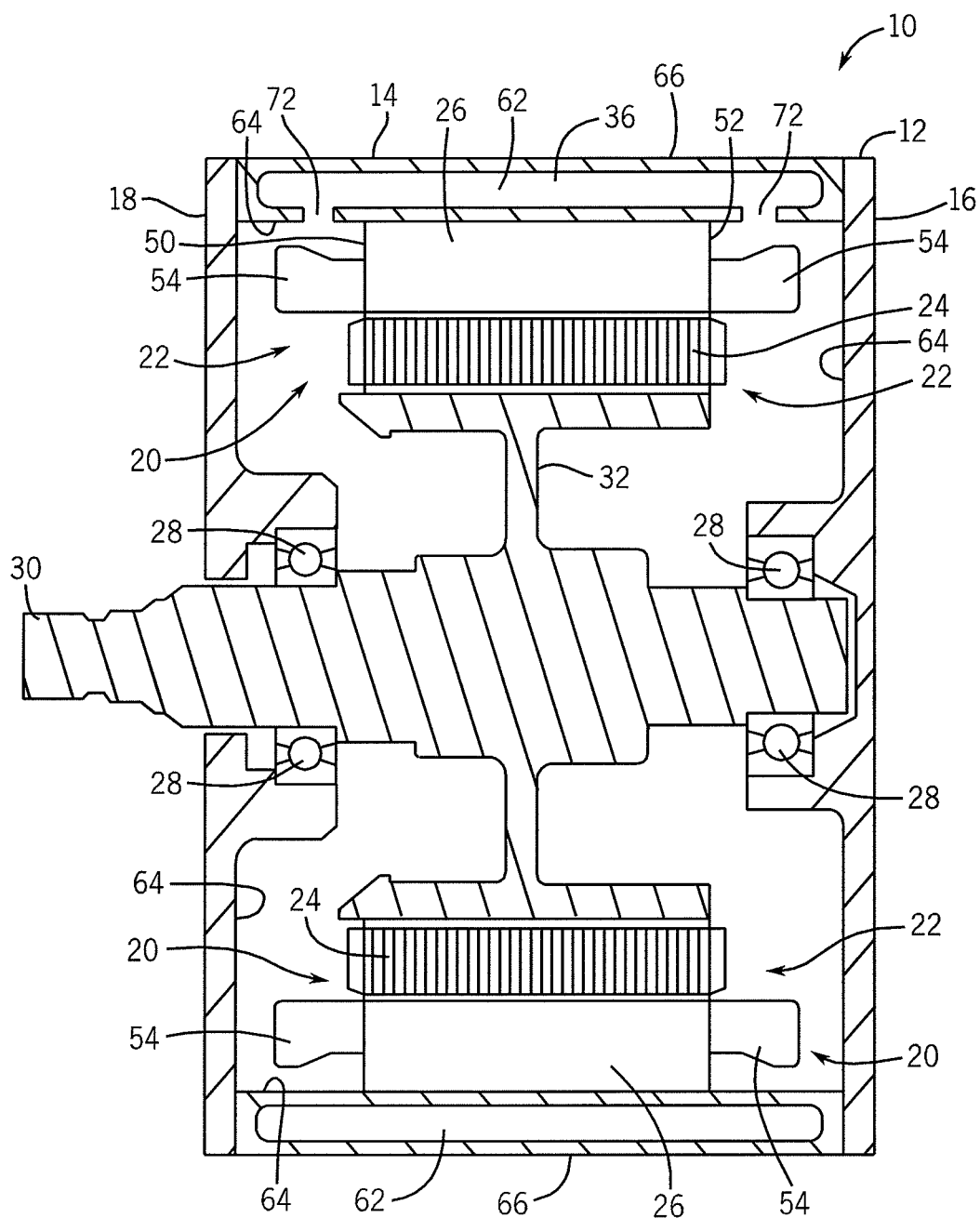
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
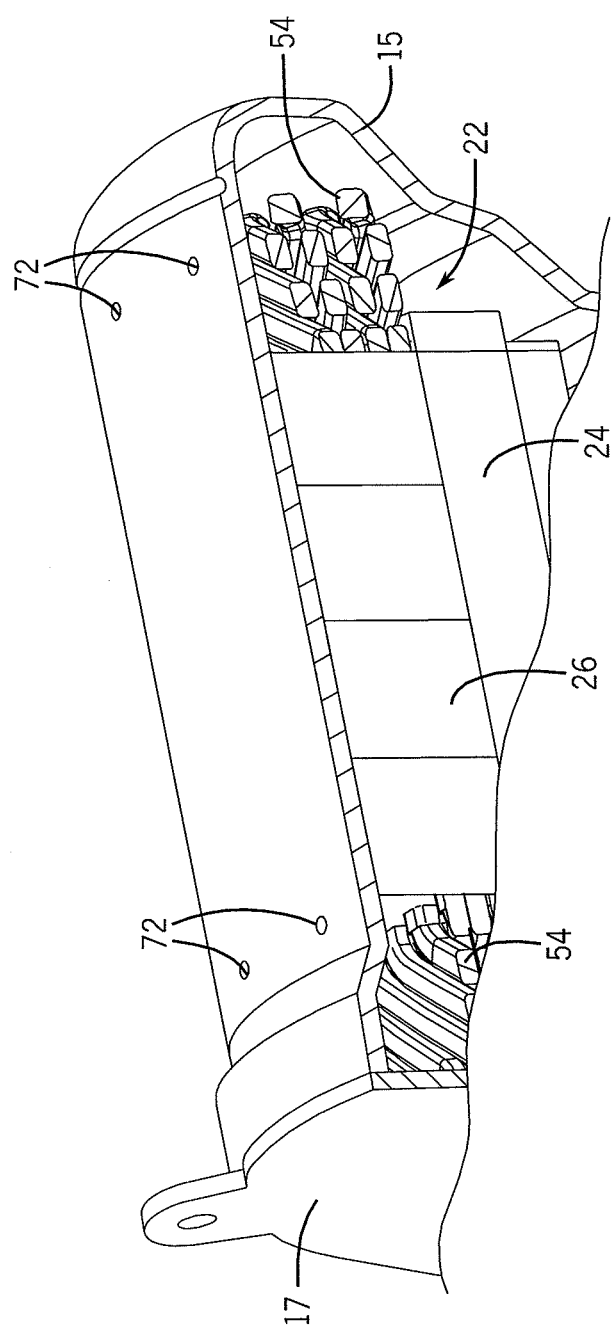
FIG. 2 is a partial cross-sectional view of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. As shown in FIG. 2, in some embodiments, the housing 12 can comprise a substantially cylindrical canister 15 and a single end cap 17. Further, in some embodiments, the module housing 12, including the sleeve member 14 and the end caps 16, 18, can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods. Additionally, in some embodiments, the housing 12 can comprise an additional structure (not shown) into which the electric machine 20 and/or the module 10 can be installed for downstream applications. For example, in some embodiments, the additional structure can comprise a transmission housing, an engine housing, a machine chassis, and any other structures in which the module 10 and/or the electric machine 20 can be installed.

The electric machine 20 can include a rotor assembly 24, a stator assembly 26, and bearings 28, and can be disposed about a shaft 30. As shown in FIGS. 1 and 2, the stator assembly 26 can substantially circumscribe at least a portion of the rotor assembly 24. In some embodiments, the rotor assembly 24 can also include a rotor hub 32 or can have a "hub-less" design (not shown).

In some embodiments, the electric machine 20 can be operatively coupled to the housing 12. For example, the electric machine 20 can be fit within the housing 12. In some embodiments, the electric machine 20 can be fit within the housing 12 using an interference fit, a shrink fit, other similar friction-based fit that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in axial, radial and circumferential directions. In some embodiments, during operation of the electric machine 20 the fit between the stator assembly 26 and the housing 12 can at least partially serve to transfer torque from the stator assembly 26 to the housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor or an induction motor for hybrid vehicle applications.

Figure 3:
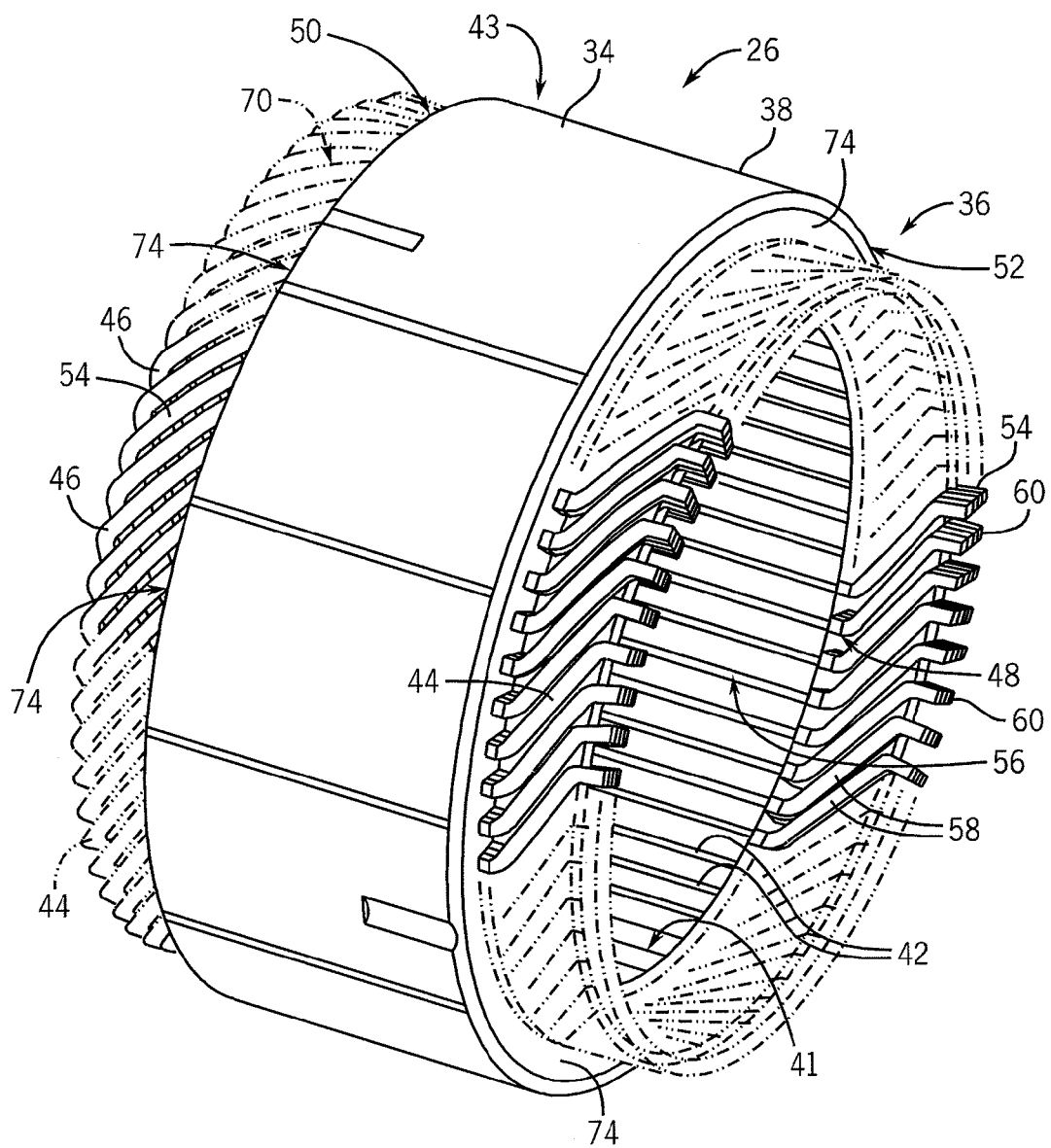
FIG. 3 is a perspective view of a stator assembly according to one embodiment of the invention.
Figure 4:
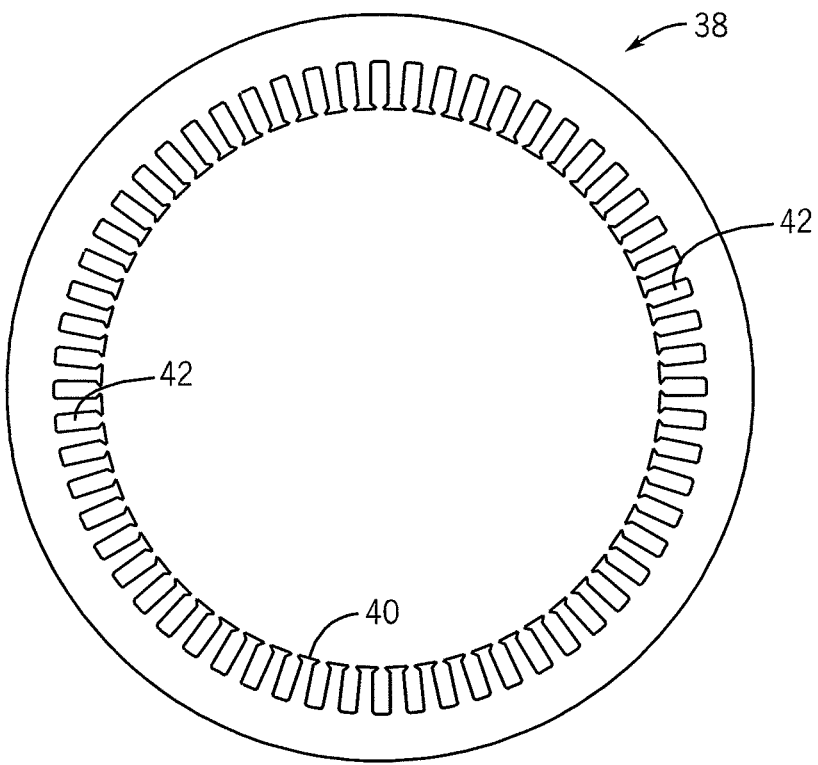
FIG. 4 is front view of a stator lamination according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 28 can include sixty slots 42. In other embodiments, the laminations 38 can include more or fewer teeth 40, and, accordingly, the stator core 34 can include more or fewer slots 42. Moreover, in some embodiments, the stator core 34 can comprise an inner perimeter 41 and an outer perimeter 43. For example, in some embodiments, the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
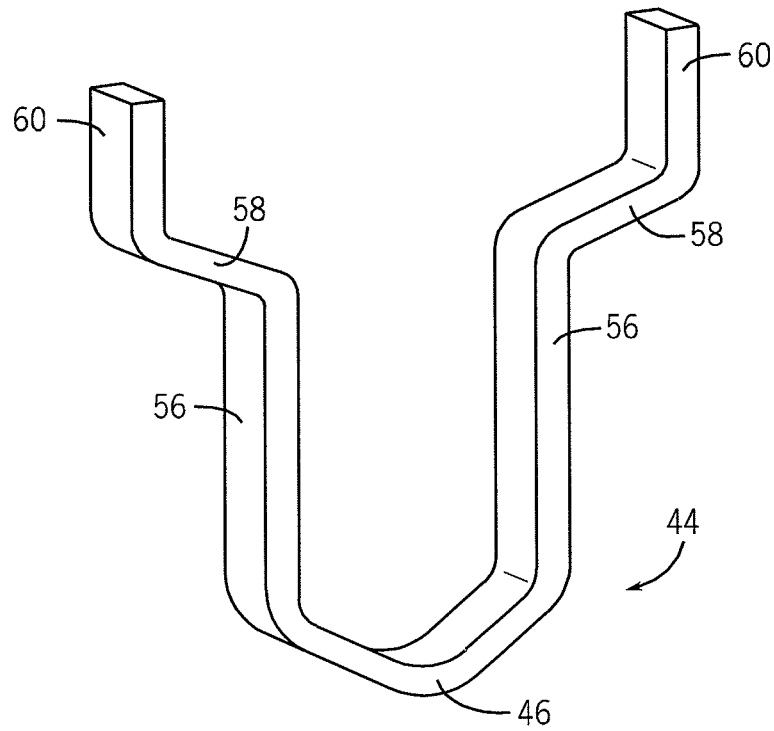
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIG. 5. For example, in some embodiments, at least a portion of the conductors 44 can include a turn portion 46 and at least two leg portions 48. In some embodiments, the turn portion 46 can be disposed between the two leg portions 48 to substantially connect the two leg portions 48. In some embodiments, the leg portions 48 can be substantially parallel. Moreover, in some embodiments, the turn portion 46 can comprise a substantially "u-shaped" configuration, although, in some embodiments, the turn portion 46 can comprise a v-shape, a wavy shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segment configuration).

In some embodiments, as shown in FIG. 3, at least a portion of the conductors 44 can be positioned substantially within the slots 42. For example, in some embodiments, the stator core 34 can be configured so that the plurality of slots 42 are substantially axially arranged. In some embodiments, the leg portions 48 can be inserted into the slots 42 so that at least some of the leg portions 48 can axially extend through the stator core 34. In some embodiments, the leg portions 48 can be inserted into neighboring slots 42. For example, in some embodiments, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at a first axial end 50 of the stator core 34 and at least some of the leg portions 48 axially extend from the stator core 34 at a second axial end 52 of the stator core 34. In some embodiments, at least a portion of the conductor 44 regions that axially extend from the core 34 at the axial ends 50, 52 can comprise stator end turns 54.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the leg portions 48 from a conductor 44.

In some embodiments, at least some of the leg portions 48 can comprise multiple regions. In some embodiments, the leg portions 48 can comprise in-slot portions 56, angled portions 58, and connection portions 60. In some embodiments, as previously mentioned, the leg portions 48 can be disposed in the slots 42 and can axially extend from the first end 50 to the second end 52. In some embodiments, after insertion, at least a portion of the leg portions 48 positioned within the slots 42 can comprise the in-slot portions 56.

In some embodiments, at least some of stator end turns 54 extending from stator core 34 at the second axial end 52 can comprise the angled portions 58 and the connection portions 60. In some embodiments, after inserting the conductors 44 into the stator core 34, the leg portions 48 extending from the stator core 34 at the second axial end 52 can undergo a twisting process (not shown) that can lead to the creation of the angled portions 58 and the connection portions 60. For example, in some embodiments, the twisting process can give rise to the angled portions 58 at a more axially inward position and the connection portions 60 at a more axially outward position, as shown in FIGS. 3 and 5. In some embodiments, after the twisting process, the connection portions 60 of at least a portion of the conductors 44 can be immediately adjacent to connection portions 60 of other conductors 44. As a result, the connection portions 60 can be coupled together to form one or more stator windings 36. In some embodiments, the connection portions 60 can be coupled via welding, brazing, soldering, melting, adhesives, or other coupling methods. Additionally, in some embodiments, the angled portions 58 and the connection portions 60 can extend from the first axial end 50 and can be configured and arranged in a similar manner as some previously mentioned embodiments.

In some embodiments, some components of the electric machine 20 such as, but not limited to, the rotor assembly 24, the stator assembly 26, and the stator end turns 54, can generate heat during operation of the electric machine 20. These components can be cooled to increase the performance and the lifespan of the electric machine 20.

In some embodiments, dissipation of heat energy at the stator end turns 54 can be insufficient to ensure efficient operations of the electric machine 20. For example, in some embodiments, heat energy can be produced by the stator end turns 54 as a result of current flowing through the end turns 54 during operation of the electric machine 20. Convection of the heat energy via air in the machine cavity 22 to the stator core 34 and/or the housing 12 can be substantially insufficient because air comprises relatively poor thermal conductivity properties. As a result, in some embodiments, because of insufficient convection of heat energy to the housing 12 and/or the stator core 34, the stator end turns 54 can exhibit relatively large copper losses, which can result in inefficient operation of the electric machine 20.

Figure 6:
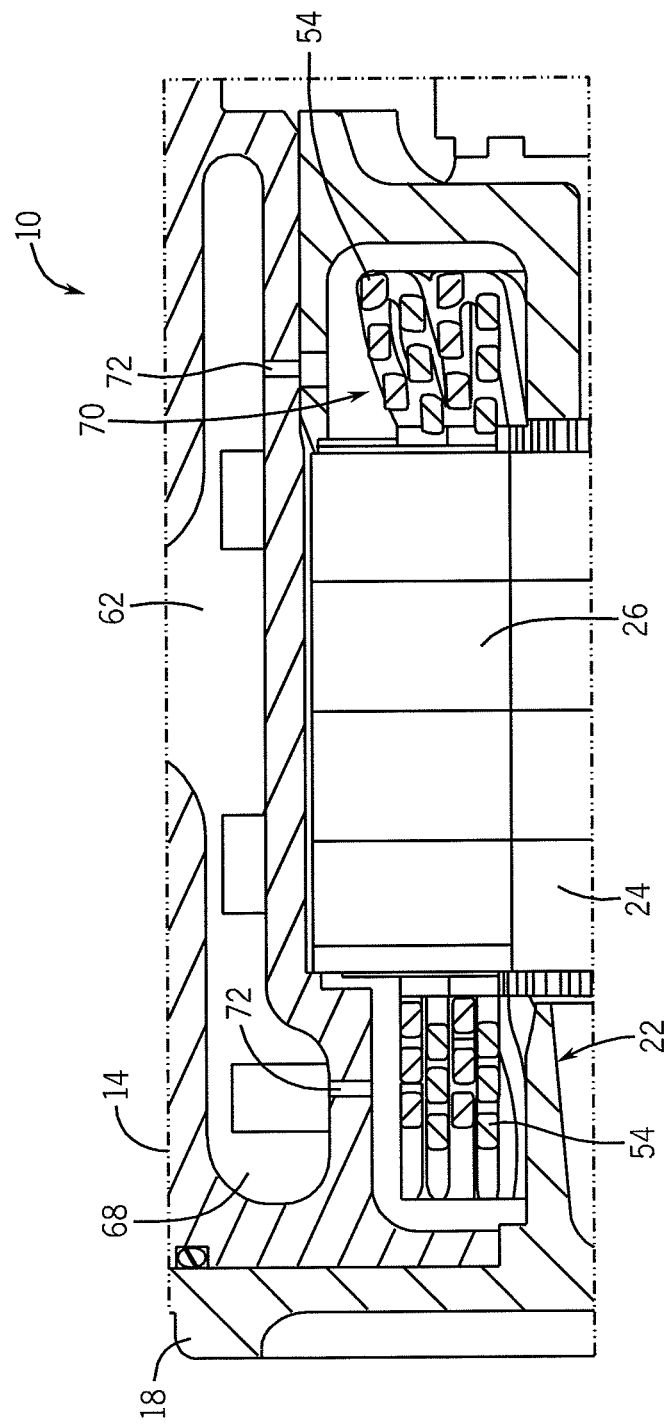
FIG. 6 is a partial cross-sectional view of portions of an electric machine module according to one embodiment of the invention.

As shown in FIGS. 1 and 6, in some embodiments, the housing 12 can comprise a coolant jacket 62. In some embodiments, the housing 12 can include an inner wall 64 and an outer wall 66 and the coolant jacket 62 can be positioned substantially between at least a portion the walls 64, 66. For example, in some embodiments, the machine cavity 22 can be at least partially defined by the inner wall 64 (e.g., each of the elements of the housing 12 can comprise a portion of the inner wall 64). In some embodiments, the coolant jacket 62 can substantially circumscribe at least a portion of the electric machine 20. For example, in some embodiments, the coolant jacket 62 can substantially circumscribe at least a portion of the outer perimeter 43 of the stator assembly 26, including the stator end turns 54.

Further, in some embodiments, the coolant jacket 62 can contain a coolant that can comprise transmission fluid, ethylene glycol, an ethylene glycol/water mixture, water, oil, motor oil, a gas, a mist, or a similar substance. The coolant jacket 62 can be in fluid communication with a coolant source (not shown) which can pressurize the coolant prior to or as it is being dispersed into the coolant jacket 62, so that the pressurized coolant can circulate through the coolant jacket 62.

According to some embodiments of the invention, the coolant jacket 62 can include multiple configurations. In some embodiments, at least a portion of the coolant jacket 62 can extend through the housing 12 a distance substantially similar to an axial length of the stator assembly 26. For example, in some embodiments, an axial length of a portion of the coolant jacket 62 can extend at least the same distance as the axial length of the stator assembly 26, including the stator end turns 54. In some embodiments, portions of the coolant jacket 62 can extend greater and lesser axial distances, as desired by manufacturers and/or end users for cooling.

In some embodiments, a portion of the coolant jacket 62 also can comprise at least one radially inward extension 68. For example, as shown in FIG. 6, in some embodiments, a region of the housing 12 (e.g., the inner wall 66) can be substantially radially recessed so that the radially inward extension 68 of the coolant jacket 62 can be substantially adjacent to at least a portion of the stator end turns 54. In some embodiments, the radially inward extensions 68 can be positioned adjacent to one of, both of, or neither of the sets of stator end turns 54. Further, in some embodiments, the coolant jacket 62 can comprise radially inward extensions 68 substantially continuously around at least a portion of an outer diameter of at least one of the stator end turns 54 (i.e., one continuous radially inward extension around a portion of at least one of the stator end turns 54). In other embodiments, the coolant jacket 62 can comprise substantially discrete radially inward extensions 68 positioned around and adjacent to at least a portion of an outer diameter 70 of at least one set of the stator end turns 54. In some embodiments, the housing 12 can comprise at least two radially inward extensions 68. For example, in some embodiments, the housing 12 can comprise two halves coupled together in a substantially axially central location so that each half of the housing 12 can comprise a radially inward extension 68 and the electric machine 20 can be positioned substantially between the two halves.

In some embodiments, the stator end turns 54 can comprise a generally lesser outer diameter 70 compared to the stator core 34, and, as a result, a greater distance can exist between the stator end turns 54 and the cooling jacket 62. In some embodiments, the radially inward extensions 68 of the coolant jacket 62 can enhance module 10 cooling because some of the coolant can circulate relatively closer to the stator end turns 54, compared to embodiments substantially lacking the radially inward extension 68. As a result, in some embodiments, a distance between the coolant and an area rejecting heat energy (i.e., the stator end turns 54) can be generally minimized, which can lead to generally increased heat energy transfer.

In some embodiments, at least a portion of the housing 12 can comprise at least one coolant aperture 72. In some embodiments, the housing 12 can comprise a plurality of coolant apertures 72. In some embodiments, at least a portion of the coolant apertures 72 can be disposed through a portion of the housing 12 to fluidly connect the coolant jacket 62 and the machine cavity 22. For example, in some embodiments, at least a portion of the coolant apertures 72 can be disposed through a portion of the inner wall 66 of the housing 12 (e.g., the canister 15, the sleeve member 14, and/or any other portion of the housing 12) to fluidly connect the coolant jacket 62 with the machine cavity 22. Moreover, in some embodiments, as previously mentioned, at least a portion of coolant circulating through the coolant jacket 62 can be pressurized so that as coolant circulates through the coolant jacket 62, at least a portion of the coolant can pass through the coolant apertures 68 can enter the machine cavity 22.

As shown in FIGS. 1, 2, and 6, in some embodiments, at least a portion of the coolant apertures 72 can be positioned substantially adjacent to the stator end turns 54. For example, in some embodiments, the coolant apertures 72 can be positioned radially outward from at least a portion of the stator end turns 54. Moreover, in some embodiments, the coolant apertures 72 can be positioned adjacent to at least one of the axial sides 50, 52 of the stator assembly 26. In other embodiments, the coolant apertures 72 can be positioned through other portions of the housing 12 and adjacent to other elements of the module 10. In addition, in some embodiments, the coolant apertures 72 can be at least partially circumferentially arranged, relative to the stator end turns 54 in regular or irregular patterns. For example, in some embodiments, the coolant apertures 72 can be positioned in a generally localized fashion (e.g., the coolant apertures 72 can be located in a generally upper portion and/or a generally lower portion of the module 10).

In some embodiments, at least a portion of the coolant can flow from the coolant jacket 62 into the machine cavity 22 via the coolant apertures 72. For example, in some embodiments, because of the general proximity of at least a portion of the coolant apertures 72 to at least a portion of the stator end turns 54, at least a portion of the coolant can contact the stator end turns 54 and receive at least a portion of heat energy produced by the stator end turns 54.

Figure 7:
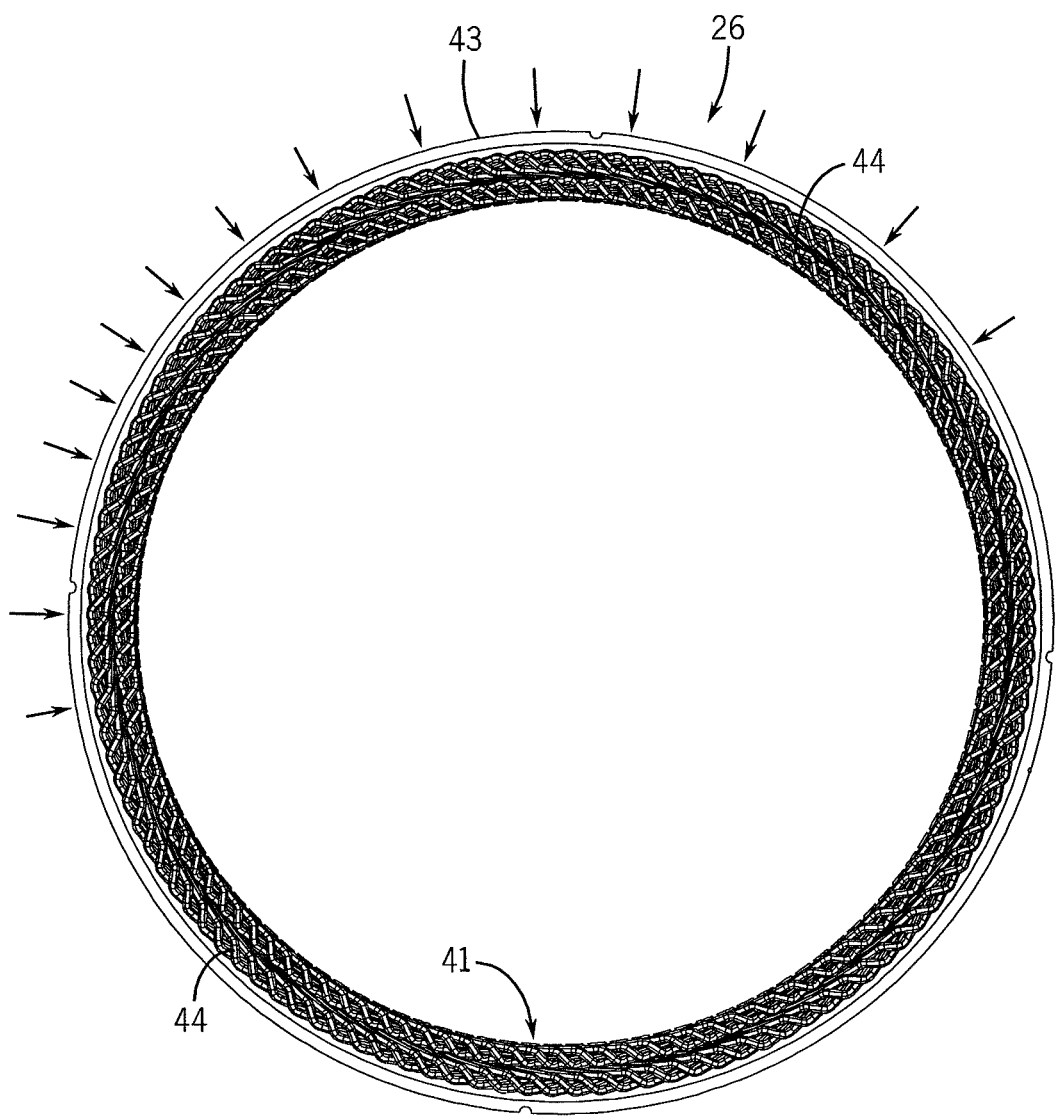
FIG. 7 is side view of a stator assembly and coolant distribution pattern according to one embodiments of the invention.

In some embodiments, the coolant apertures 72 can comprise multiple configurations. In some embodiments, at least a portion of the coolant apertures 72 can comprise asymmetric configurations. In some embodiments, at least a portion of the coolant apertures 72 can be configured and arranged so that some regions of the stator end turns 54 can receive a different volume of coolant relative to other regions of the stator end turns 54. For example, in some embodiments, as reflected by the arrows in FIG. 7, some circumferential portions of the stator end turns 54 can receive a greater volume (i.e., the arrows of FIG. 7 generally represent volume of coolant) of coolant from some of the coolant apertures 72 generally adjacent to those circumferential portions relative to other circumferential portions.

In some embodiments, the asymmetric coolant distribution can be provided in different manners. In some embodiments, at least a portion of the coolant apertures 72 can comprise asymmetric dimensions. In some embodiments, a first portion of the coolant apertures 72 can comprise a greater perimeter size than a second portion of the coolant apertures 72. For example, in some embodiments, at least a portion of the coolant apertures 72 can comprise a generally annular configuration, and, accordingly, a first portion of the coolant apertures 72 can comprise a greater circumference relative to a second portion of the coolant apertures 72. In other embodiments, the coolant apertures 72 can comprise other shapes (e.g., elliptical, square, rectangular, regular or irregular polygonal, etc) or the coolant apertures 72 through a portion of the housing 12 need not all comprise the same shape. As a result, in some embodiments, at least some of the coolant apertures 72 comprising greater perimeters can emit a greater volume of coolant per unit of time (i.e., a greater flow rate) relative to coolant apertures 72, which can lead to asymmetric coolant flow.

In some embodiments, the asymmetric coolant distribution can be provided in other manners. In some embodiments, different regions of the housing 12 can comprise different distributions of coolant apertures 72. For example, in some embodiments, a first angular span of the housing 12 (e.g., 45 degrees, 75 degrees, 90 degrees, 120 degrees, etc.) can comprise a greater number of coolant apertures 72 disposed through the housing 12 to fluidly connect the coolant jacket 62 and the machine cavity 22 relative to a second angular span of the housing 12. By way of further example only, in some embodiments, the housing 12 can be generally divided into quadrants (e.g., divided into four substantially equally-sized subunits) and the number of coolant apertures 72 in one of the quadrants adjacent to the first axial end 50 can comprise a greater number of coolant apertures 72 relative to another quadrant adjacent to the first axial end 50. As a result, in some embodiments, regions of the housing 12 comprising greater numbers of coolant apertures 72 can emit a greater volume of coolant relative to other regions of the housing 12 that can include lesser numbers of coolant apertures 72. Additionally, in some embodiments, some regions of the housing 12 can comprise greater numbers of coolant apertures 72, and at least a portion of the coolant apertures 72 can comprise a greater perimeter, which can further enhance coolant emission from the coolant jacket 62. Moreover, in some embodiments, coolant aperture 72 configurations can also vary according to axial side 50, 52 (e.g., a greater volume of coolant can be emitted on the first axial side 50 relative to the second axial side 52 and vice versa).

In some embodiments, at least a portion of the coolant apertures 72 can comprise asymmetric locations and asymmetric configurations. For example, in some embodiments, depending at least in part upon the axial, radial, and/or circumferential position of a portion of the coolant apertures 72 relative to other coolant apertures 72, some of the coolant apertures 72 can direct coolant to multiple axial locations along an axial length of at least a portion of the stator end turns 54. By way of example only, in some embodiments, at least a portion of the coolant apertures 72 adjacent to a first circumferential location of the stator assembly 26 (e.g., around a "3 o'clock" position) can direct at least a portion of the coolant toward a substantially axially inward location generally immediately adjacent to an axial face 74 of the stator core 34, as shown by the dots in FIG. 8A. Moreover, in some embodiments, at least a portion of the coolant apertures 72 adjacent to a second circumferential location of the stator assembly 26 (e.g., around a "9 o'clock" position) can direct at least a portion of the coolant to an axially outward location (e.g., substantially adjacent to an axially outermost point of a portion of the connection portions 60), as shown by the dots in FIG. 8B. As a result, in some embodiments, at least a portion of the coolant apertures 72 can direct coolant toward different impingement locations that can be different axial distances from the stator core 34. In some embodiments, some coolant apertures 72 in any other circumferential locations can be configured and arranged to direct coolant flow toward an axially inner, axially outer, and/or an axially central location, with respect to at least a portion of the stator end turns 54.

At least some of the previously mentioned embodiments can comprise a substantially radially linear coolant flow path from some of the coolant apertures 72 toward at least a portion of the stator end turns 54. In some embodiments, at least a portion of the coolant apertures 72 can be configured and arranged to direct at least a portion of the coolant flow in a substantially radially non-linear direction. Moreover, in some embodiments, a portion of the coolant channels 72 can be configured and arranged to direct at least a portion of the coolant flow in a substantially radially non-linear direction and another portion of the coolant channels 72 can be configured and arranged to direct at least a portion of the coolant flow in a substantially radially linear direction (i.e., a generally asymmetric configuration with respect to coolant flow direction). For example, in some embodiments, as shown by the arrows in FIG. 9A, at least a portion of the coolant apertures 72 adjacent to a first circumferential location of the stator assembly 26 (e.g., around a "3 o'clock" position) can direct at least a portion of the coolant flow in a substantially linear (e.g., radially inward) direction. Although, in some embodiments, the coolant apertures 72 adjacent to the first circumferential location can be configured and arranged to direct at least a portion of the coolant flow in a non-linear direction (e.g., axially inward or axially outward). In some embodiments, as shown by the arrows in FIG. 9B, at least a portion of the coolant apertures 72 adjacent to a second circumferential location of the stator assembly 26 (e.g., around a "9 o'clock" position) can direct at least a portion of the coolant flow in a substantially radially non-linear (e.g., radially inward and axially outward) direction. In some embodiments, some coolant apertures 72 in any other circumferential locations can be configured and arranged to direct coolant flow toward an axially inner, axially outer, and/or an axially central location in either a radially linear or a radially-linear direction, with respect to at least a portion of the stator end turns 54. Moreover, in some embodiments, any combination of any of the previous embodiments of asymmetrically and/or symmetrically configured coolant apertures 72 can be combined to produce enhanced cooling results desired by manufacturers and/or end users. As a result, for reasons described in further detail below, at least a portion of the coolant flow can be optimally guided relevant to the geometry of the stator end turns 54 at multiple locations.

The geometry of at least a portion of the stator end turns 54 can lead to thermal imbalances in some conventional electric machines. Some configurations of the end turns 54 can lead to undesirable coolant distribution after contacting the end turns 54. For example, after exiting the coolant apertures 72, portions of the coolant can generally either flow axially inward or axially outward toward an axially outer region of the end turns 54 or the axial face 74 of the stator core 34, respectively.

Moreover, in some conventional electric machines, this coolant distribution dynamic can give rise to a thermal imbalance. Some portions of coolant that flow toward an axially outer region of the end turns 54 can receive a generally greater amount of heat energy produced by the end turns 54 than do some portions of coolant that flow generally axially inward and contact the axial face 74, which can give rise to the thermal imbalance between different portions of the stator end turns 54. More specifically, in some conventional electric machines, the thermal imbalance can arise because after some portions of the coolant contact the axial face 74, at least a portion of the coolant can flow along the axial face 74 (e.g., only briefly contacting the stator end turns 54 to receive a portion of their heat energy) and can quickly reach a bottom portion of the stator assembly 26, receiving relatively little end turn 54 heat energy. Further, at least a portion of the coolant that flows axially outward can pass along the axially outer region of the end turns 54 in a generally circumferential direction while maintaining substantially constant contact with portions of the end turns 54. As a result, at least a portion of the coolant can receive a greater amount of heat energy from the end turns 54 as the coolant flows toward the bottom portion of the stator assembly 26 because of the increased contact duration relative to the coolant flowing along the axial face 74. Accordingly, regions of the end turns 54 where the coolant flows axially outward can comprise a generally lower operating temperature than do regions of the stator end turns 54 where the coolant flows axially inward because of the increased coolant exposure duration and resulting thermal transfer.

The thermal imbalance can at least partially arise because of the arrangement and configuration of some portions of the stator winding 36. For example, as previously mentioned, the conductors 44 can undergo a twisting process that can give rise to the angle portions 58 and the connection portions 60 on the second axial side 52. In some embodiments, during the twisting process, at least a portion of the conductors 44 can be twisted in circumferential directions. As a result of the twisting process and the formation of the angled and connection portions 58, 60, the direction of coolant flow after impingement upon the end turns 54 can be at least partially dictated by the relative circumferential position of the stator assembly 26. For example, on substantially circumferentially opposite sides of the stator assembly 24, after coolant impingement upon portions of the stator end turns 54, coolant can be directed in substantially opposite axial directions.

Figure 10A:
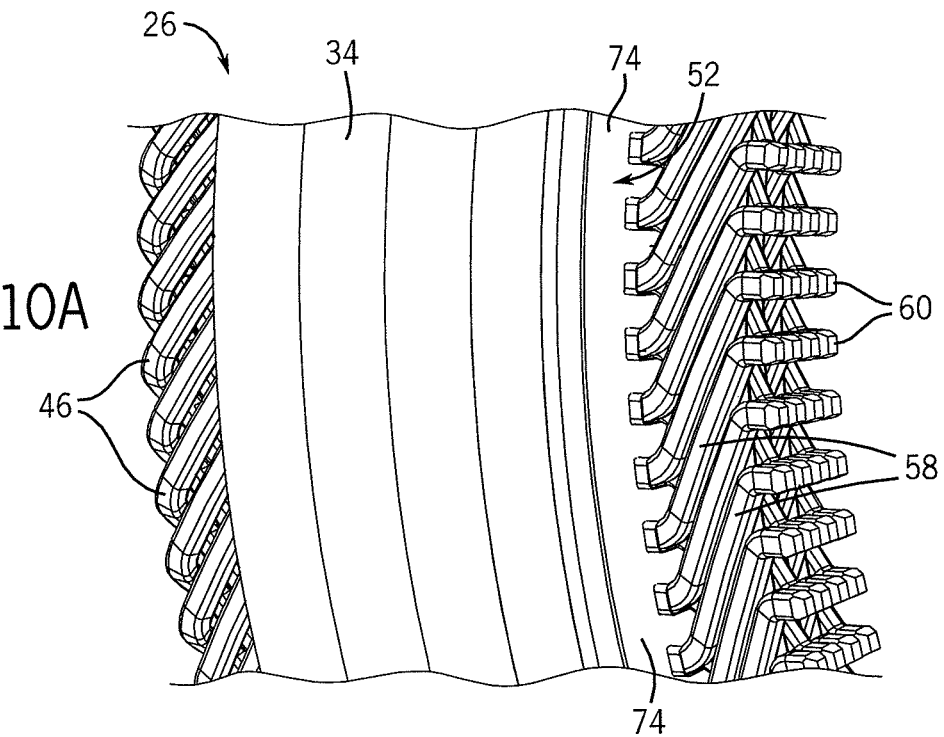
FIGS. 10A and 10B are partial isometric views of a stator assembly and coolant distribution patterns of some conventional electric machines.
Figure 10B:
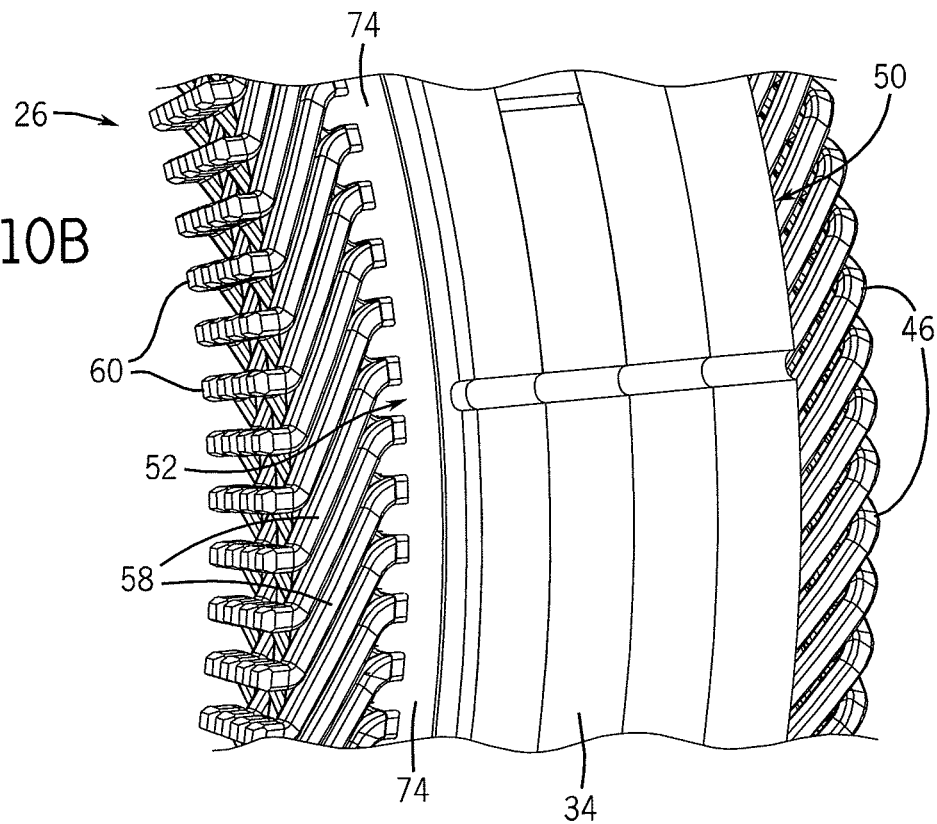

By way of example only, as shown in FIG. 10A, at a generally "9 o'clock" circumferential position, after coolant impingement, at least a portion of the coolant can be directed substantially axially inward toward the axial face 74, which, as previously mentioned, can result in reduced heat energy transfer from the end turns to the coolant. Moreover, as shown in FIG. 10B, at a generally "3 o'clock" circumferential position, after coolant impingement, at least a portion of the coolant can be directed substantially axially outward toward an axially outer region of the end turns 54 (e.g., the connection portions 60), which, as previously mentioned, can result in increased heat energy transfer from the end turns 54 to the coolant. Furthermore, these configurations can at least partially depend upon the circumferential direction in which the end turns 54 are twisted. For example, the radially outermost end turns 54 can be twisted in the opposite circumferential direction relative to the end turns 54 shown in FIGS. 10A and 10B, in which case coolant will be directed axially inward at the generally "3 o'clock" circumferential position and axially outward at the generally "9 o'clock" circumferential position (not shown). Additionally, in some embodiments, both axial sides 50, 52 of the stator assembly 26 can comprise a substantially similar configuration in terms of opposite axial coolant flow for substantially circumferentially opposing locations after impingement of the stator end turns 54. Generally, regardless of the twisting direction and axial side 50, 52, as a result of at least some of the previously mentioned end turn 54 configurations, a thermal imbalance (e.g., portions of the stator end turns 54 comprise greater operating temperatures relative to other portions of the stator end turns 54) can occur between end turns 54 in different circumferential locations. By way of further example only, as shown by the radially outer temperature measurements in FIG. 12, some temperatures around the generally "3 o'clock" position can operate at a higher temperature (i.e., about 156 degrees Celsius) relative to the generally "9 o'clock" position (i.e., about 148 degrees Celsius) because the end turns 54 at the "3 o'clock" position can be configured and arranged to direct coolant axially inward and the end turns 54 at the "9 o'clock" position can be configured and arranged to direct coolant axially outward.

Some embodiments of the invention can provide enhanced cooling capabilities relative to some conventional electric machines. In some embodiments, at least a portion of the coolant entering the machine cavity 22 via the coolant apertures 72 can be more efficiently and optimally employed in cooling the module 10. For example, in some embodiments, a greater volume of coolant can be directed to regions of the stator end turns 54 where at least a portion of the coolant flows axially inward after impingement upon the end turns 54 (e.g., a 9 o'clock position) relative to regions of the stator end turns 54 where at least a portion of the coolant flows axially outward after impingement (e.g., a 3 o'clock position). In some embodiments, this coolant volume differential can be at least partially provided by asymmetric properties of the coolant apertures, such as, but not limited to asymmetric size (e.g., apertures 72 comprise greater perimeters for more coolant flow where greater volumes of coolant are distributed), asymmetric numbers (e.g., greater numbers of apertures 72 for more coolant flow where greater volumes of coolant are distributed), or a combination thereof. As a result, in some embodiments, greater volumes of coolant can impinge upon areas of the stator assembly 26 so that cooling can be increased without the need to provide greater volumes of coolant through all of the apertures 72.

Figure 11B:
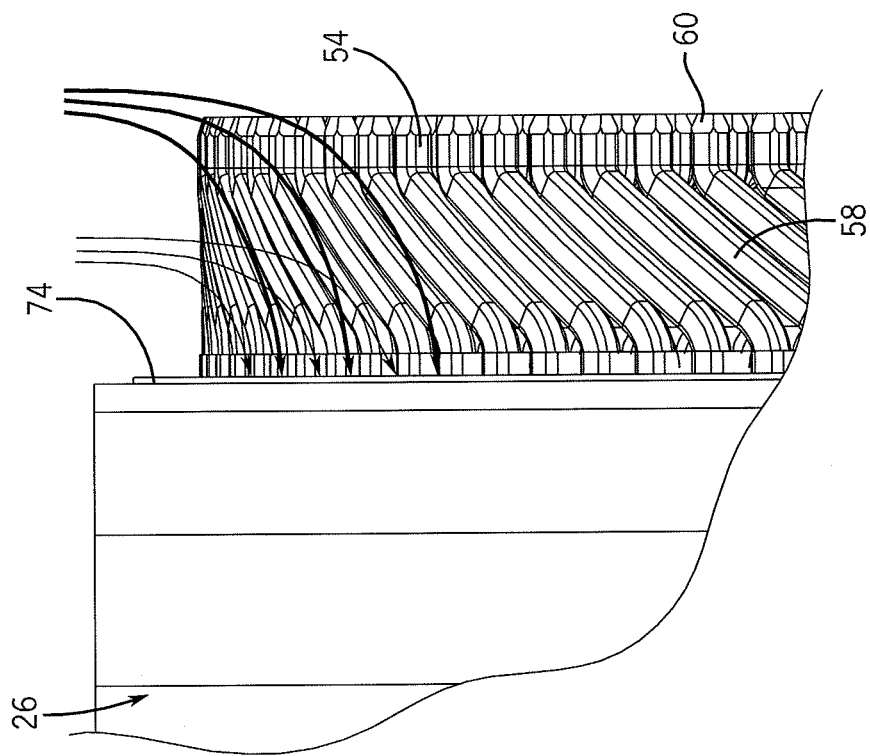
FIGS. 11A and 11B are partial views representing conventional coolant flow and coolant flow according to some embodiments of the invention.
Figure 11A:
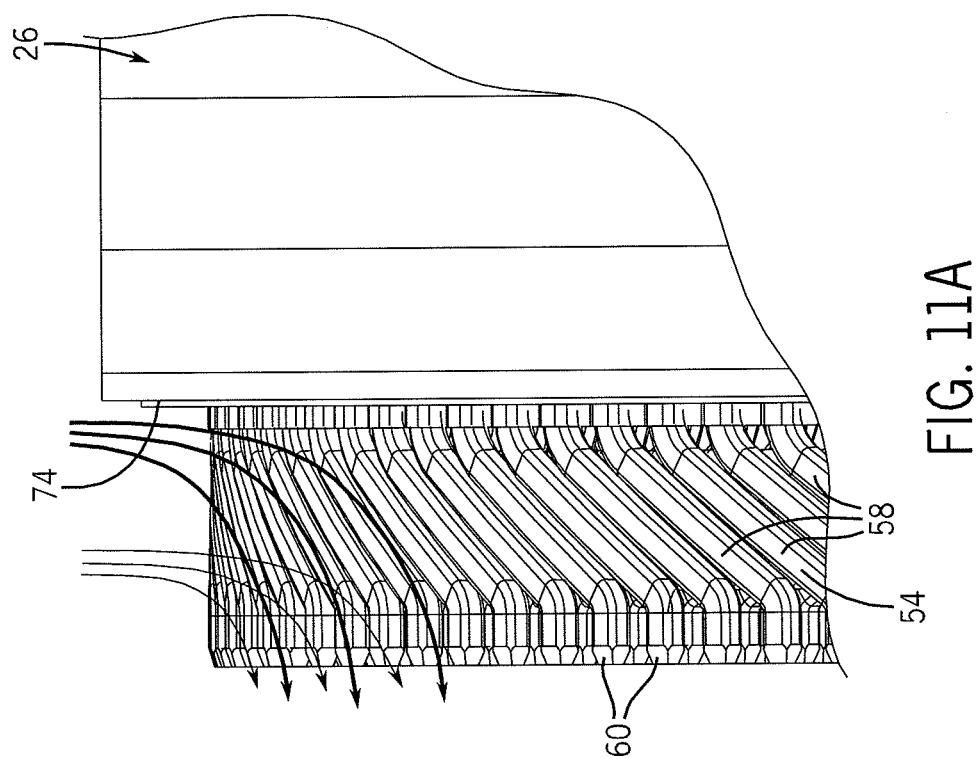

Additionally, in some embodiments, some other coolant apertures 72 can provide cooling benefits in addition to or in lieu of some of the previously mentioned embodiments. In some embodiments, at least a portion of the coolant apertures 72 can comprise asymmetric locations, which can provide enhanced cooling. In some embodiments, at least a portion of the coolant apertures 72 adjacent to regions of the stator end turns 54 where coolant flows axially inward after impingement (e.g., end turns 54 that can be less efficiently cooled, as previously mentioned) can be configured and arranged to direct at least a portion of the coolant toward a more axially outward impingement location, as shown in FIG. 11B. Moreover, in some embodiments, at least a portion of the coolant apertures 72 adjacent to regions of the stator end turns 54 where coolant flows axially outward after impingement (e.g., end turns 54 that can be more efficiently cooled, as previously mentioned) can be configured and arranged to direct at least a portion of the coolant toward a more axially inward impingement location, as shown in FIG. 11A. As a result, in some embodiments, an approximately 50% greater surface area of the end turns 54 can be exposed to at least a portion of the coolant, which can enhance cooling and module 10 operations.

In some embodiments, at least a portion of the coolant apertures 72 can be configured and arranged to direct at least a portion of the coolant toward different impingement locations. For example, as previously mentioned, in some embodiments, at least a portion of the coolant apertures 72 can be physically located in different positions (e.g., located immediately radially outward from the desired impingement location). Additionally, in some embodiments, at least a portion of the coolant apertures 72 can be configured to angularly direct the coolant to a desired impingement point (e.g., the coolant apertures 72 can be positioned in the same general circumferential location, but some can be angled to more precisely direct at least a portion of the coolant). Moreover, in some embodiments, the module 10 can comprise a combination of any of the previously mentioned coolant aperture 72 configurations.

Figure 12:
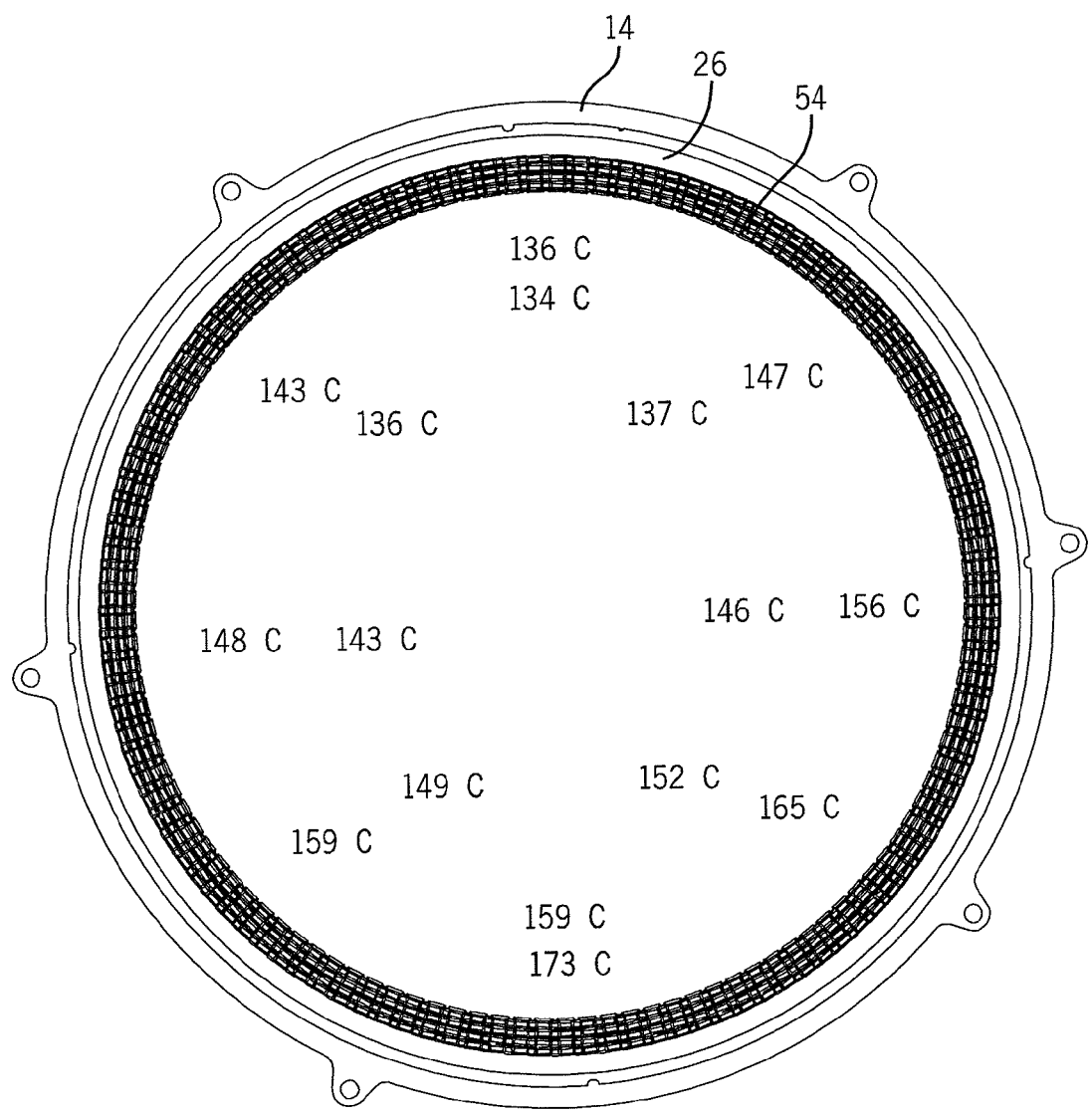
FIG. 12 is a side view of a stator assembly including changes in temperature associated with some embodiments of the invention.

As a result, at least a portion of the stator end turns 54 can be more efficiently cooled because of the directed coolant distribution system provided by some embodiments of the invention. For example, as shown in FIG. 12, in some embodiments, the differential in end turn 54 temperatures previously mentioned can be at least partially reduced. As shown by the more radially inward temperatures, by employing some embodiments of the invention, the temperature differential between the "3 o'clock" position and the "9 o'clock" position can be reduced because coolant can be more effectively applied to regions of the end turns 54 that are less efficiently cooled in some conventional electric machines.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   a housing at least partially defining a machine cavity;
   a coolant jacket being at least partially positioned within the housing; and
   a plurality of coolant apertures being at least partially circumferentially disposed through a portion of the housing so that the coolant jacket is in fluid communication with the machine cavity, the plurality of coolant apertures further comprising
      a first group of coolant apertures being configured and arranged to direct a first volume of a coolant from the coolant jacket, and
      a second group of coolant apertures being configured and arranged to direct a second volume of the coolant from the coolant jacket, wherein the first volume of coolant is greater than the second volume of coolant; and
   a stator assembly positioned within the machine cavity so that the coolant jacket substantially circumscribes at least a portion of the stator assembly, the stator assembly comprising a stator core including axial faces and stator end turns extending from the stator core, and wherein at least a portion of the coolant apertures are substantially adjacent to at least a portion of the stator end turns; and
   wherein a first portion of the stator end turns are configured and arranged to guide at least a portion of the coolant axially inward toward at least one of the axial faces of the stator core, and a second portion of the stator end turns are configured and arranged to guide at least a portion of the coolant axially outward; and
   wherein the stator assembly is positioned within the machine cavity so that the first portion of stator end turns is substantially adjacent to the first group of coolant apertures and the second portion of stator end turns is substantially adjacent to the second group of coolant apertures.

2. An electric machine module comprising:
   a housing at least partially defining a machine cavity;
   a coolant jacket being at least partially positioned within the housing; and
   a plurality of coolant apertures being at least partially circumferentially disposed through a portion of the housing so that the coolant jacket is in fluid communication with the machine cavity, the plurality of coolant apertures further comprising a first group of coolant apertures being configured and arranged to direct a first volume of a coolant from the coolant jacket, and a second group of coolant apertures being configured and arranged to direct a second volume of the coolant from the coolant jacket, wherein the first volume of coolant is greater than the second volume of coolant; and a stator assembly positioned within the machine cavity so that the coolant jacket substantially circumscribes at least a portion of the stator assembly, the stator assembly comprising a stator core including axial faces and stator end turns extending from the stator core, and wherein at least a portion of the coolant apertures are substantially adjacent to at least a portion of the stator end turns; and wherein a first portion of the stator end turns are configured and arranged to guide at least a portion of the coolant axially inward toward at least one of the axial faces of the stator core, and a second portion of the stator end turns are configured and arranged to guide at least a portion of the coolant axially outward; and wherein the plurality of coolant apertures further comprises a third group of coolant apertures configured and arranged to direct at least a portion of the coolant to a first impingement location on at least a portion of the stator end turns and a fourth group of coolant apertures configured and arranged to direct at least a portion of the coolant to a second impingement location on at least a portion of the stator end turns, wherein the first impingement location is a greater axial distance from the stator core than is the second impingement location.

3. An electric machine module comprising:
a housing at least partially defining a machine cavity;
a coolant jacket being at least partially positioned within the housing; and
a plurality of coolant apertures being at least partially circumferentially disposed through a portion of the housing so that the coolant jacket is in fluid communication with the machine cavity, the plurality of coolant apertures further comprising:
   a first group of coolant apertures being configured and arranged to direct a first volume of a coolant from the coolant jacket, and
   a second group of coolant apertures being configured and arranged to direct a second volume of the coolant from the coolant jacket, wherein the first volume of coolant is greater than the second volume of coolant; and a stator assembly positioned within the machine cavity so that the coolant jacket substantially circumscribes at least a portion of the stator assembly, the stator assembly comprising a stator core including axial faces and stator end turns extending from the stator core, and wherein at least a portion of the coolant apertures are substantially adjacent to at least a portion of the stator end turns; and wherein a first portion of the stator end turns are configured and arranged to guide at least a portion of the coolant axially inward toward at least one of the axial faces of the stator core, and a second portion of the stator end turns are configured and arranged to guide at least a portion of the coolant axially outward; and wherein the plurality of coolant apertures further comprises a third group of coolant apertures configured and arranged to direct at least a portion of the coolant to a first impingement location on at least a portion of the stator end turns and a fourth group of coolant apertures configured and arranged to direct at least a portion of the coolant to a second impingement location on at least a portion of the stator end turns, wherein the first impingement location is a greater axial distance from the stator core than is the second impingement location; and wherein the stator assembly is positioned within the machine cavity so that the first portion of the stator end turns is substantially adjacent to the third group of coolant apertures and the second portion of stator end turns is substantially adjacent to the fourth group of coolant apertures.

4. An electric machine module comprising:
a housing at least partially defining a machine cavity;
a coolant jacket being at least partially positioned within the housing;
a stator assembly positioned within the machine cavity and at least partially enclosed by the housing so that the coolant jacket substantially circumscribes at least a portion of the stator assembly, the stator assembly including a stator core including axial faces and stator end turns extending from the stator core;
a plurality of coolant apertures being at least partially circumferentially disposed through a portion of the housing so that the coolant jacket is in fluid communication with the machine cavity, the plurality of coolant apertures positioned substantially adjacent to at least a portion of the stator assembly, and the plurality of coolant apertures further comprising:
   a first group of coolant apertures being configured and arranged to direct a portion of a coolant to a first impingement location on at least a portion of the stator end turns, and
   a second group of coolant apertures being configured and arranged to direct a portion of the coolant to a second impingement location on at least a portion of the stator end turns, wherein the first impingement location is a greater axial distance from the stator core than is the second impingement location; and wherein a first portion of the stator end turns are configured and arranged to guide at least a portion of the coolant axially inward toward at least one of the axial faces of the stator core, and a second portion of the stator end turns are configured and arranged to guide at least a portion of the coolant axially outward away from at least one of the axial faces of the stator core; and wherein the plurality of coolant apertures further comprises a third group of coolant apertures being configured and arranged to direct at least a portion of the coolant to an impingement location on a portion of the stator end turns substantially immediately adjacent to the stator core, the third group of coolant apertures being further configured and arranged so that after contacting the stator end turns, at least a portion of the coolant flows axially outward, and wherein the stator assembly is positioned within the machine cavity so that the first portion of the stator end turns is substantially adjacent to the third group of coolant apertures.

5. An electric machine module comprising:
a housing at least partially defining a machine cavity;
a coolant jacket being at least partially positioned within the housing;
a stator assembly positioned within the machine cavity and at least partially enclosed by the housing so that the coolant jacket substantially circumscribes at least a portion of the stator assembly, the stator assembly including a stator core including axial faces and stator end turns extending from the stator core;
a plurality of coolant apertures being at least partially circumferentially disposed through a portion of the housing so that the coolant jacket is in fluid communication with the machine cavity, the plurality of coolant apertures positioned substantially adjacent to at least a portion of the stator assembly, and the plurality of coolant apertures further comprising:
- a first group of coolant apertures being configured and arranged to direct a portion of a coolant to a first impingement location on at least a portion of the stator end turns, and
- a second group of coolant apertures being configured and arranged to direct a portion of the coolant to a second impingement location on at least a portion of the stator end turns, wherein the first impingement location is a greater axial distance from the stator core than is the second impingement location; and wherein the plurality of coolant apertures further comprises a fourth group of coolant apertures being configured and arranged to direct a first volume of the coolant from the coolant jacket toward the stator end turns and a fifth group of coolant apertures being configured and arranged to direct a second volume of the coolant from the coolant jacket, wherein the first volume of coolant is greater than the second volume of coolant.

6. An electric machine module comprising:
- a housing at least partially defining a machine cavity;
- a coolant jacket being at least partially positioned within the housing;
- a stator assembly positioned within the machine cavity and at least partially enclosed by the housing so that the coolant jacket substantially circumscribes at least a portion of the stator assembly, the stator assembly including a stator core including axial faces and stator end turns extending from the stator core;
- a plurality of coolant apertures being at least partially circumferentially disposed through a portion of the housing so that the coolant jacket is in fluid communication with the machine cavity, the plurality of coolant apertures positioned substantially adjacent to at least a portion of the stator assembly, and the plurality of coolant apertures further comprising:
  - a first group of coolant apertures being configured and arranged to direct a portion of a coolant to a first impingement location on at least a portion of the stator end turns, and
  - a second group of coolant apertures being configured and arranged to direct a portion of the coolant to a second impingement location on at least a portion of the stator end turns, wherein the first impingement location is a greater axial distance from the stator core than is the second impingement location; and wherein the plurality of coolant apertures further comprises a fourth group of coolant apertures being configured and arranged to direct a first volume of the coolant from the coolant jacket toward the stator end turns and a fifth group of coolant apertures being configured and arranged to direct a second volume of the coolant from the coolant jacket, wherein the first volume of coolant is greater than the second volume of coolant; and wherein the fourth group of coolant apertures comprises a greater number of coolant apertures relative to the fifth group of coolant apertures.

7. An electric machine module comprising:
- a housing at least partially defining a machine cavity;
- a coolant jacket being at least partially positioned within the housing;
- a stator assembly positioned within the machine cavity and at least partially enclosed by the housing so that the coolant jacket substantially circumscribes at least a portion of the stator assembly, the stator assembly including a stator core including axial faces and stator end turns extending from the stator core;
- a plurality of coolant apertures being at least partially circumferentially disposed through a portion of the housing so that the coolant jacket is in fluid communication with the machine cavity, the plurality of coolant apertures positioned substantially adjacent to at least a portion of the stator assembly, and the plurality of coolant apertures further comprising:
  - a first group of coolant apertures being configured and arranged to direct a portion of a coolant to a first impingement location on at least a portion of the stator end turns, and
  - a second group of coolant apertures being configured and arranged to direct a portion of the coolant to a second impingement location on at least a portion of the stator end turns, wherein the first impingement location is a greater axial distance from the stator core than is the second impingement location; and wherein the plurality of coolant apertures further comprises a fourth group of coolant apertures being configured and arranged to direct a first volume of the coolant from the coolant jacket toward the stator end turns and a fifth group of coolant apertures being configured and arranged to direct a second volume of the coolant from the coolant jacket, wherein the first volume of coolant is greater than the second volume of coolant; and wherein at least a portion of the fourth group of coolant apertures comprises a greater perimeter relative to the fifth group of coolant apertures.

* * * * *